US012020582B2

(12) United States Patent
Barker et al.

(10) Patent No.: US 12,020,582 B2
(45) Date of Patent: Jun. 25, 2024

(54) STACKABLE HOUSING CONTAINERS AND RELATED SYSTEMS

(71) Applicant: Deere & Company, Moline, IL (US)

(72) Inventors: Mark E. Barker, Johnston, IA (US); Aaron A. Wells, Johnston, IA (US); Bradley J. Bauer, West Bend, WI (US); Troy K. Maddox, Anamosa, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/162,674

(22) Filed: Jan. 31, 2023

(65) Prior Publication Data
US 2023/0196929 A1 Jun. 22, 2023

Related U.S. Application Data

(62) Division of application No. 16/888,288, filed on May 29, 2020, now Pat. No. 11,636,771.
(Continued)

(51) Int. Cl.
*B65D 85/68* (2006.01)
*B60L 53/80* (2019.01)
(Continued)

(52) U.S. Cl.
CPC ............... *G08G 5/02* (2013.01); *B60L 53/80* (2019.02); *B64C 39/024* (2013.01); *B64F 1/28* (2013.01);
(Continued)

(58) Field of Classification Search
CPC .. B65D 2585/687; B64U 80/70; B64U 70/50; B64U 70/90; B64U 70/92; B64U 70/93; B64U 80/10
See application file for complete search history.

(56) References Cited

U.S. PATENT DOCUMENTS

| 4,123,020 A | 10/1978 | Korsak |
| 8,511,606 B1 | 8/2013 | Lutke et al. |

(Continued)

FOREIGN PATENT DOCUMENTS

| CA | 1278288 C | * 12/1990 | ................ B64F 1/12 |
| CN | 207535770 | 6/2018 | |

(Continued)

OTHER PUBLICATIONS

European Patent Office, "Extended European Search Report," issued in connection with European Patent Appl. No. 20193162.3, dated Feb. 4, 2021, 9 pages.
(Continued)

*Primary Examiner* — Christopher P Ellis
(74) *Attorney, Agent, or Firm* — Hanley, Flight & Zimmerman, LLC

(57) ABSTRACT

Methods, apparatus, systems, and articles of manufacture are disclosed to house a vehicle, including a first container leg disposed on a first corner of a first container, a second container leg disposed on a second corner of the first container, a third container leg disposed on a third corner of the first container, a fourth container leg disposed on a fourth corner of the first container, at least one of the first, second, third, and fourth container legs each having an upper portion with a ramped receiving slot and a lower portion with a first ramped foot, and wherein the ramped receiving slot is to receive a protrusion associated with a second ramped foot of a second container different from the first container.

20 Claims, 13 Drawing Sheets

Related U.S. Application Data

(60) Provisional application No. 62/897,377, filed on Sep. 8, 2019.

(51) Int. Cl.

| | | |
|---|---|---|
| *B64C 39/02* | (2023.01) | |
| *B64F 1/28* | (2006.01) | |
| *B64F 1/36* | (2017.01) | |
| *B64U 30/20* | (2023.01) | |
| *B64U 80/70* | (2023.01) | |
| *B65D 21/02* | (2006.01) | |
| *G08G 5/02* | (2006.01) | |
| *B64U 10/13* | (2023.01) | |
| *B64U 50/19* | (2023.01) | |

(52) U.S. Cl.
CPC ............ *B64F 1/36* (2013.01); *B65D 21/0215* (2013.01); *B65D 85/68* (2013.01); *B60L 2200/10* (2013.01); *B64U 10/13* (2023.01); *B64U 30/20* (2023.01); *B64U 50/19* (2023.01); *B64U 80/70* (2023.01); *B65D 2585/687* (2013.01)

(56) References Cited

U.S. PATENT DOCUMENTS

| | | | |
|---|---|---|---|
| 9,139,310 B1 | 9/2015 | Wang | |
| 9,764,836 B1 * | 9/2017 | Elzinga | B64C 39/024 |
| 9,783,075 B2 | 10/2017 | Henry et al. | |
| 10,207,820 B2 | 2/2019 | Sullivan et al. | |
| 10,453,348 B2 | 10/2019 | Speasl et al. | |
| 10,467,685 B1 * | 11/2019 | Brisson | G06Q 30/0645 |
| 10,549,850 B1 * | 2/2020 | Ryan | B64U 80/70 |
| 10,913,546 B2 | 2/2021 | Krauss et al. | |
| 11,636,771 B2 * | 4/2023 | Barker | G08G 5/02 |
| | | | 701/16 |
| 11,794,922 B1 * | 10/2023 | Twyford | B64C 39/024 |
| 2006/0249622 A1 * | 11/2006 | Steele | B64F 1/02 |
| | | | 244/115 |
| 2011/0139665 A1 | 6/2011 | Madsen | |
| 2015/0336669 A1 * | 11/2015 | Kantor | G01C 21/343 |
| | | | 701/3 |
| 2016/0364989 A1 * | 12/2016 | Speasl | G08G 5/0082 |
| 2017/0129464 A1 | 5/2017 | Wang et al. | |
| 2019/0002127 A1 | 1/2019 | Straus et al. | |
| 2019/0023416 A1 | 1/2019 | Borko et al. | |
| 2019/0270526 A1 * | 9/2019 | Hehn | B64U 80/70 |
| 2020/0165007 A1 | 5/2020 | Augugliaro et al. | |
| 2021/0070468 A1 * | 3/2021 | Svirsky | B64F 1/222 |
| 2021/0107682 A1 | 4/2021 | Kozlenko et al. | |
| 2021/0107684 A1 * | 4/2021 | Le Lann | B65D 88/121 |
| 2021/0197983 A1 | 7/2021 | Wang et al. | |
| 2022/0019247 A1 | 1/2022 | Dayan et al. | |

FOREIGN PATENT DOCUMENTS

| | | | |
|---|---|---|---|
| CN | 109018413 | 12/2018 | |
| DE | 102018203290 A1 * | 3/2019 | |
| DE | 112017007148 T5 * | 12/2019 | ........... B64C 39/024 |
| EP | 3241747 | 11/2017 | |
| EP | 3241747 A1 * | 11/2017 | ........... B64C 39/024 |
| FR | 3050981 A1 * | 11/2017 | ........... B64C 39/024 |
| WO | 2017029611 | 2/2017 | |
| WO | 2017109780 | 6/2017 | |
| WO | 2019111251 | 6/2019 | |
| WO | 201919151947 | 8/2019 | |
| WO | WO-2022045459 A1 * | 3/2022 | |

OTHER PUBLICATIONS

European Patent Office, "Communication Under Rule 71(3) EPC," issued in connection with European Patent Appl. No. 20193162.3, dated Jul. 21, 2022, 5 pages.

United States Patent and Trademark Office, "Notice of Allowance and Fee(s) Due," issued in connection with U.S. Appl. No. 16/888,288, dated Dec. 14, 2022, 8 pages.

United States Patent and Trademark Office, "Corrected Notice of Allowability," issued in connection with U.S. Appl. No. 16/888,288, dated Mar. 15, 2023, 2 pages.

United States Patent and Trademark Office, "Requirement for Restriction and/or Election," issued in connection with U.S. Appl. No. 16/888,288, dated Sep. 9, 2022, 5 pages.

\* cited by examiner

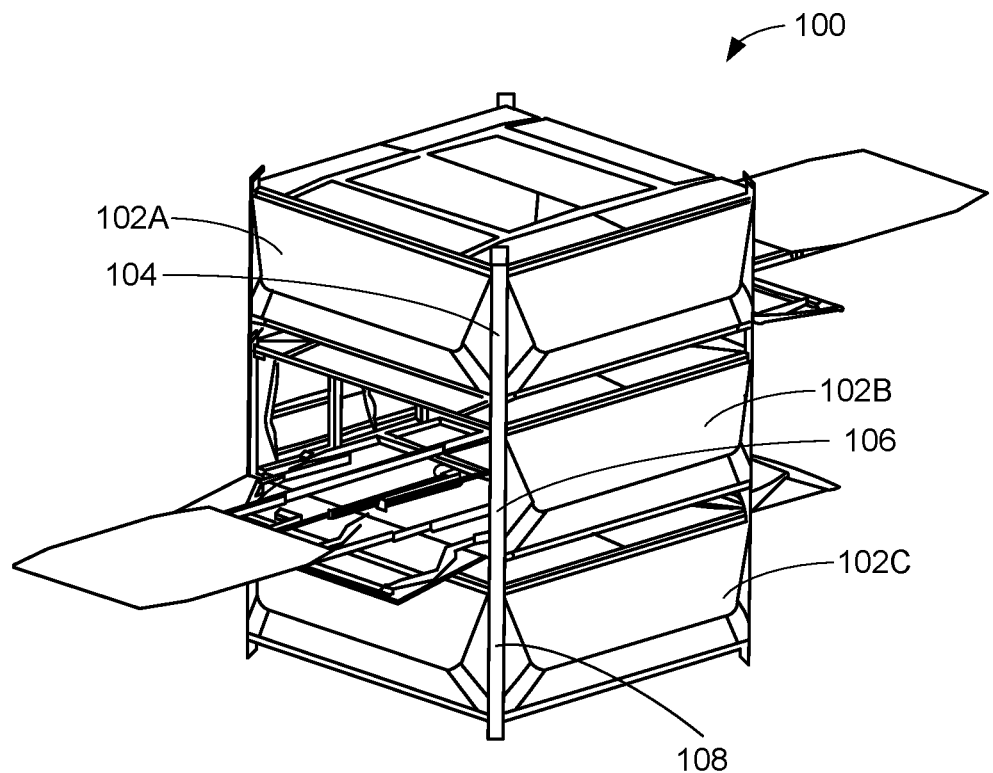
FIG. 1
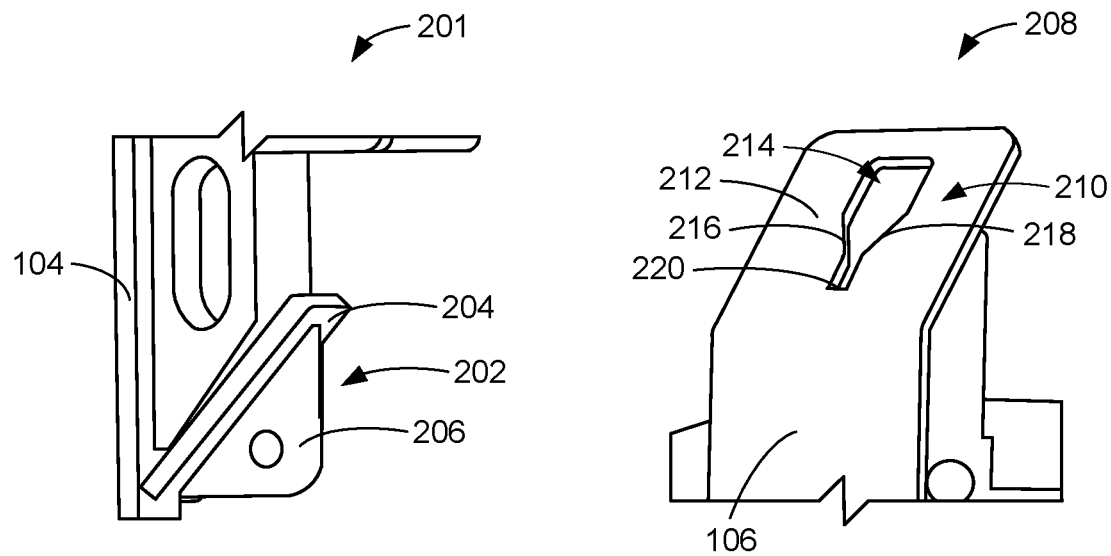
FIG. 2A
FIG. 2B

STACKABLE HOUSING CONTAINERS AND RELATED SYSTEMS

RELATED APPLICATION

This patent arises from a divisional of U.S. patent application Ser. No. 16/888,288 filed on May 29, 2020, which claims the benefit of U.S. Provisional Patent Application Ser. No. 62/897,377, which was filed on Sep. 8, 2019. U.S. patent application Ser. No. 16/888,288 and U.S. Provisional Patent Application Ser. No. 62/897,377 are hereby incorporated herein by reference in their entirety. Priority to U.S. patent application Ser. No. 16/888,288 and U.S. Provisional Patent Application Ser. No. 62/897,377 is hereby claimed.

FIELD OF THE DISCLOSURE

This disclosure relates generally to housing containers and, more particularly, to stackable housing containers and related systems.

BACKGROUND

An unmanned aerial vehicle (UAV) is an aircraft without a human pilot on board. UAVs are a component of an unmanned aircraft system (UAS); which include a UAV, a ground-based controller, and a system of communications between the two. The flight of UAVs can operate with various degrees of autonomy: either under remote control by a human operator or autonomously by onboard computers.

BRIEF DESCRIPTION OF THE DRAWINGS

FIG. 1 is a perspective view of a stacked housing container system for storing rotorcrafts.

FIGS. 2A, 2B, and 2C are enlarged views of a portion of the containers that implement the stacked housing container system of FIG. 1.

Figure 2C:
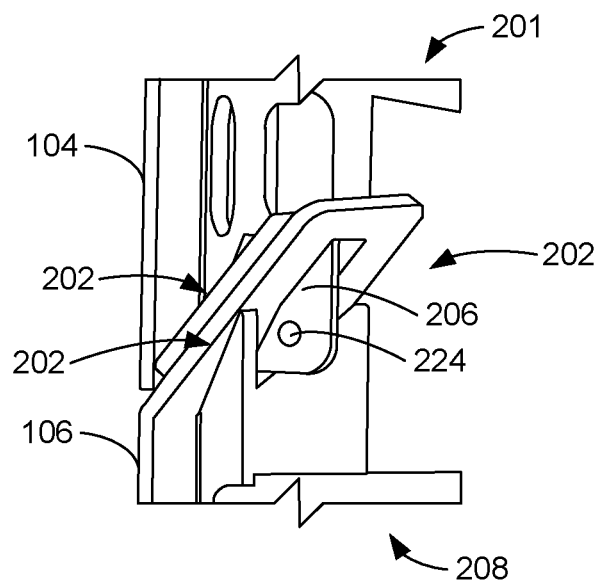

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

UAV systems are increasingly being considered for use in agricultural applications. UAV systems (e.g., agricultural drones, quadrotor rotorcrafts, quadcopters, multi-rotor UAVs, etc.) can improve the accuracy with which operations are performed in a field, reduce operator fatigue, and accrue other benefits. An agricultural drone is a UAV system applied to farming in order to help increase crop production and monitor crop growth. For example, sensors and digital imaging capabilities of the agricultural UAV system can give farmers a more detailed picture of their fields. This information has proved useful in improving crop yields and farm efficiency. For example, for large agricultural environments with thousands of acres of farming land, it may be rendered laborious, time inefficient, and difficult to monitor crop growth.

In some examples, a fleet of UAVs and/or UAV systems (e.g., UAVs and accompanying systems such as fluid refilling systems, etc.) are used for a single agricultural environment. In one example, a fleet is a number of UAV systems operating together. For example, five to ten, or more, UAV systems may be utilized to spray the agricultural field with fertilizer at precise times because the timing of fertilizer application has a significant effect on crop yields. However, the fleet of UAV systems requires increased manual labor for the maintenance and guidance of each UAV used in the agricultural environment. In some examples, UAV systems are remotely controlled by an operator.

Additionally, the task of maintaining and guiding the fleet of UAV systems is cumbersome. For example, UAV systems, especially those deployed as a part of a fleet, are subject to the wear and tear of constant use. Thus, regular maintenance checks of each UAV system are required to ensure proper operation. Regular maintenance checks include removing batteries, cleaning UAV chassis, replacing broken parts, re-filling fluids (e.g., water, fertilizer, other chemicals), etc. These maintenance checks may be performed in locations that are considered "home" for the fleet of UAV systems. For example, when the fleet has completed a mission, the fleet returns to a central location where maintenance can be performed and where the fleet can be stored when not operating. In some examples, the central location for storing fleets of UAV systems may be prone to theft, vandalism, and the like.

Examples disclosed herein include stackable housing for UAV systems to ensure protection from theft and/or vandalism. Additionally, examples disclosed herein provide autonomous systems for performing regular maintenance checks on UAV systems to reduce manual labor required to maintain the UAV systems. For example, the stackable housing disclosed herein includes control systems for communicating between autonomous maintenance systems and UAV system location.

FIG. 1 is a perspective view of stacked housing container system 100 for storing (e.g., housing) multi-rotor UAVs (e.g., quadcopter helicopters, etc.). The stacked housing container system 100 includes an example first container 102A (e.g., a housing container, a stackable container, a stackable housing container, etc.), an example second container 102B, and an example third container 102C (e.g., a first, second, and third container apparatus, first, second, and third housing containers, etc.). The stacked housing container system 100 further includes an example first container leg 104, an example second container leg 106, and an example third container leg 108.

In FIG. 1, the containers 102A, 102B, 102C can be used for storing a vehicle (e.g., a rotorcraft, a quadcopter, a multi-rotor UAV, etc.). The containers 102A, 102B, and 102C can comprise equal features. For example, the containers 102A, 102B, and 102C are the same width, length, and height. A container of the containers 102A, 102B, 102C can be designated and/or configured as the supply container. Additionally, the containers 102A, 102B, and 102C include the same stacking features. The stacking features are described below in greater detail in connection with FIG. 2. The containers 102A, 102B, and 102C each comprise six walls (e.g., four side walls, a top wall, and a bottom wall). The containers 102A, 102B, and 102C can be stacked in any orientation. The containers 102A, 102B, and 102C can be stacked for transportation, for increasing area and space in the central location, etc. While the examples show containers having the same size, it is possible to have containers of different sizes.

In FIG. 1, the first leg 104 extends between a top wall and a bottom wall, wherein the top wall is the uppermost wall of the first container 102A and the bottom wall is the lowermost wall of the first container 102A in the orientation of FIG. 1. The second leg 106 extends between a top wall of the second container 102B and a bottom wall of the second container 102B. The third leg 108 extends between a top wall of the third container 102C and a bottom wall of the third container 102C. Accordingly, in illustrated example of FIG. 1, the first, second, and third legs 104, 106, 108 are arranged in tandem in a substantially vertical direction along an edge of the container system 100. In the illustrated example of FIG. 1, the first container 102A includes a first one (e.g., a first leg) of the first legs 104 disposed at a first corner of the first container 102A, a second one (e.g., a second leg) of the first legs 104 disposed at a second corner of the first container 102A, a third one (e.g., a third leg) of the first legs 104 disposed at a third corner of the first container 102A, and a fourth one (e.g., a fourth leg) of the first legs 104 disposed at a fourth corner of the first container 102A.

FIGS. 2A, 2B, and 2C are enlarged views of a portion of the containers 102A, 102B, and 102C of FIG. 1 that allow for stacking the containers 102A, 102B, and 102C of FIG. 1. FIGS. 2A, 2B, and 2C illustrate example stacking features of the stacked housing container system 100.

FIG. 2A illustrates an example bottom portion 201 of first leg 104 of FIG. 1. In the illustrated example of FIG. 2A, the first leg 104 includes a ramped foot 202 to aid alignment when stacking on top of another container (e.g., one of the second container 102B and/or the third container 102C). In FIG. 2A, the first container 102A includes four legs 104, each leg including a respective ramped foot 202. In FIG. 2A, the ramped foot 202 includes an example first angled face 204 and an example protrusion 206.

FIG. 2B illustrates an example top portion 208 of the second leg 106 of FIG. 1. In the illustrated example of FIG. 2B, the second leg 106 includes an example ramped receiving slot 210 to aid alignment with the bottom portion 201 of the first leg 104. In FIG. 2B, the ramped receiving slot 210 includes an example second angled face 212 and an example opening 214. In the illustrated example of FIG. 2B, the angled face 212 is at a substantially complementary angle with the first angled face 204. In FIG. 2B, the opening 214 of the ramped receiving slot 210 includes an example first tapered edge 216, an example second tapered edge 218, and an example base edge 220. In some examples disclosed herein, to couple the first container 102A to the second container 102B, at each ramped foot 202 (e.g., each ramped foot 202 of four ramped feet 202 corresponding to the four first legs 104) is coupled to the respective receiving slot 210 (e.g., each ramped receiving slot 210 of four ramped receiving slots 210 corresponding to the four second legs 106) by placing the protrusion 206 in the opening 214. In some of these examples, due to the force of gravity on the first container 102A, the protrusion 206 is urged by the first and second tapered edges 216, 218 towards the base edge 220 until the first angled face 204 interfaces the second angled face 212.

FIG. 2C illustrates the bottom portion 201 of the first leg 104 connected to the top portion 208 of the second leg 106. In the illustrated example of FIG. 2C, the ramped foot 202 is coupled to the ramped receiving slot 210. The base edge 220 of the opening 214 retains the protrusion 206 and the second angled face 212 retains (e.g., interfaces with) the first angled face 204. In FIG. 2C, the ramped foot 202 includes a hole 224 (e.g., an opening, a bore, etc.) for a retaining pin. When the retaining pin is inserted into the hole 224, the protrusion 206 is prevented from or otherwise less likely to back out of the opening 214. The hole 224 and the retaining pin of the ramped foot 202 ensure the stacked containers 102A and 102B remain intact (e.g., do not disconnect).

The example containers 102A, 102B, and 102C each include the ramped foot 202 and the ramped receiving slot 210 at each interface of the legs 104, 106, 108, each one of the containers 102A, 102B, 102C having four receiving slots 210 on their top end (e.g., a first end, relatively higher on the page in the view of FIG. 1) and four ramped feet 202 on their bottom end (e.g., a second end, a bottom end opposite the top end, relatively lower on the page in the view of FIG. 1). For example, the first container 102A includes four first legs 104. Each first leg 104 of the first container 102A includes the ramped foot 202 on its bottom end and the ramped receiving slot 210 on its top end. In an analogous manner, the second container 102B and the third container 102C each include four legs, each leg including the ramped foot 202 and the ramped receiving slot 210.

Referring again to the example of FIG. 1, the example stacked housing container system 100 is not limited to the number of containers illustrated in FIG. 1. The example stacked housing container system 100 can include a plurality of stacked containers with similar stacking features to house a plurality of vehicles.

Figure 3:
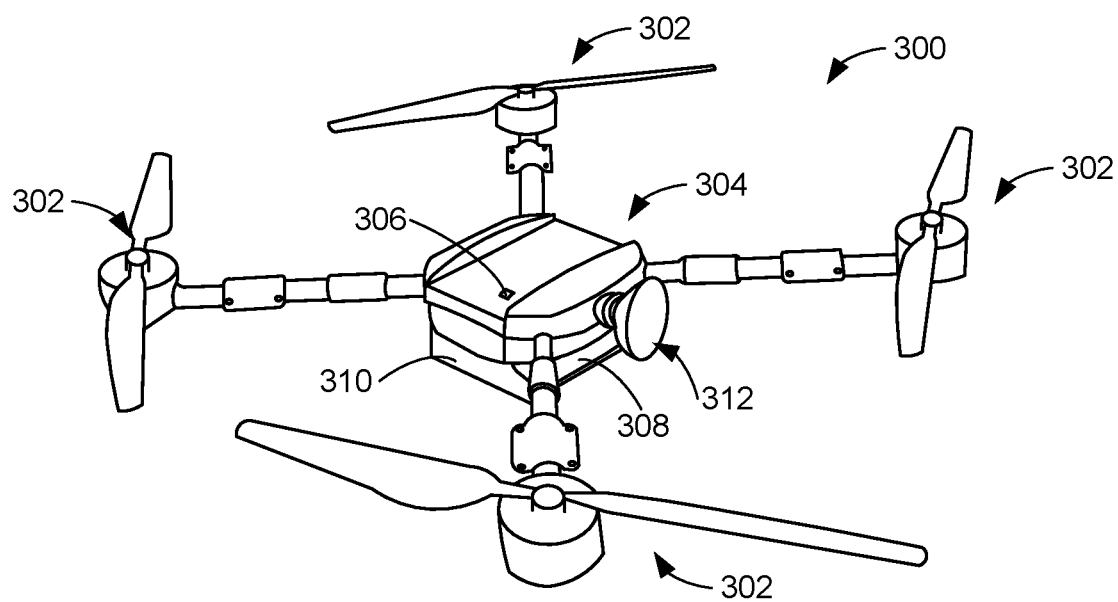
FIG. 3 is a perspective view of a rotorcraft that can be implemented in connection with the teachings of this disclosure.

FIG. 3 is a perspective view of an example rotorcraft 300 (e.g., a vehicle) that can be implemented in connection with the stacked housing container system 100 of FIG. 1. In the illustrated example of FIG. 3, the rotorcraft 300 is a multi-rotor UAV (e.g., a quadrotor helicopter, etc.). In other examples, any other suitable vehicle (e.g., aircraft, rotorcraft, etc.) can be implemented in connection with the teachings of this disclosure. In FIG. 3, the rotorcraft 300 includes four example propeller assemblies 302 spaced apart from an example central body 304. In FIG. 3, the propeller assemblies 302 may be driven by internal motors (e.g., brushless DC motors).

In the illustrated example of FIG. 3, the central body 304 of the rotorcraft 300 can internally contain such aspects as a flight controller, motor controller such as an electronic speed controller (ESC), power distribution board (PDB), global positioning system (GPS) module, inertial measurement unit (IMU), and/or other onboard processors and modules. In this example, the central body 304 includes an example communications module 306. For example, the communications module 306 may be capable of receiving and sending communication data (e.g., Radio Frequency (RF) signals, etc.) and can be communicatively coupled to a flight controller. In FIG. 3, the central body 304 includes an example battery 308 disposed in an example battery container 310. In FIG. 3, the central body 304 also includes an example fluid inlet 312.

Figure 4A:
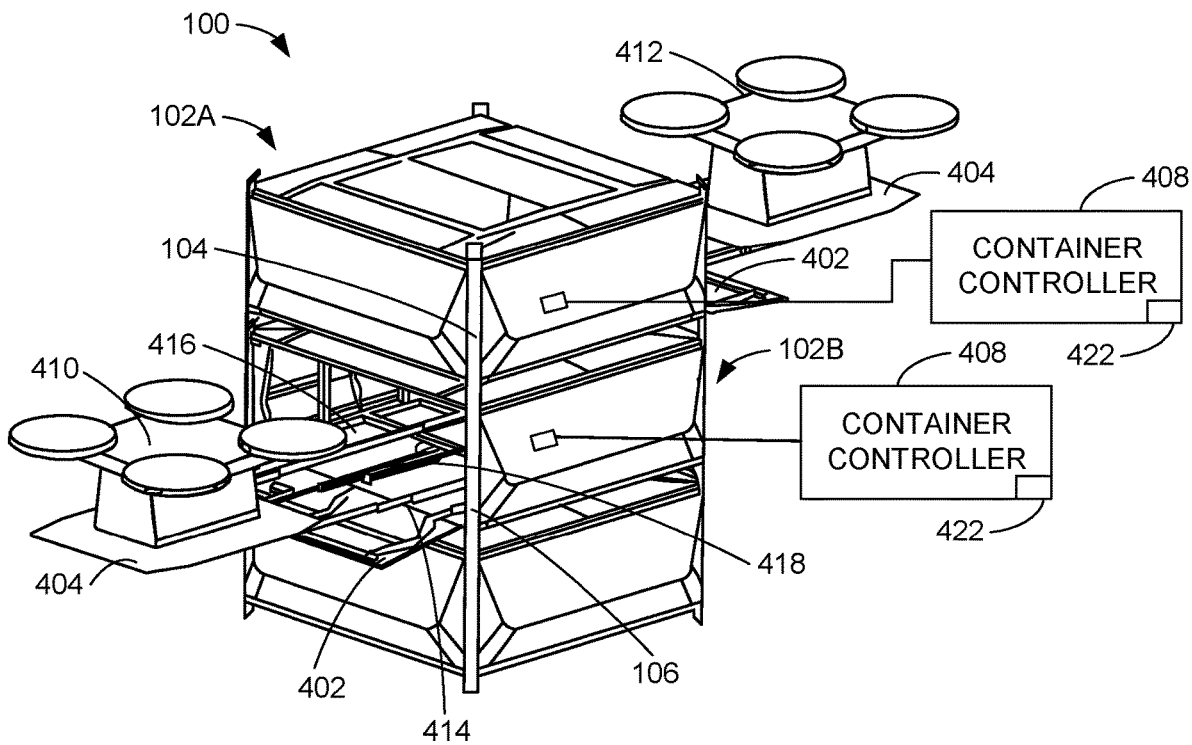
FIGS. 4A and 4B are a perspective view and an enlarged perspective view of the stacked housing container system of FIG. 1 including example hinged covers, example extendable landing pads, and example container controllers.

FIG. 4A is a perspective view of the stacked housing container system 100 including example hinged covers 402, example extendable landing pads 404, an example container controller 408, an example first representative rotorcraft 410, and an example second representative rotorcraft 412. In the illustrated example of FIG. 4, the first and second representative rotorcrafts 410, 412 are representative illustrations of the rotorcraft 300 of FIG. 3 and include all aspects of the rotorcraft 300 discussed in connection with FIG. 3.

In the illustrated example of FIG. 4A, the stacked housing container system 100 includes the hinged covers 402 (e.g., example doors, example hinged wall covers, etc.). In FIG. 4A, the hinged covers 402 are coupled to the legs (e.g., the first and second legs 104, 106) of each container. For example, a hinged cover of the hinged covers 402 can extend from a first corner (e.g., a first corner proximate a first one of the legs 104 of the first container 102A) to a second corner (e.g., a second corner proximate a second one of the legs 104 of the first container 102A) of a container (e.g., the first container 102A). In FIG. 4A, the hinged cover 402 of the second container 102B forms an example hinged connection 414 of with an example lower surface 416 of the second container 102B.

Figure 4B:
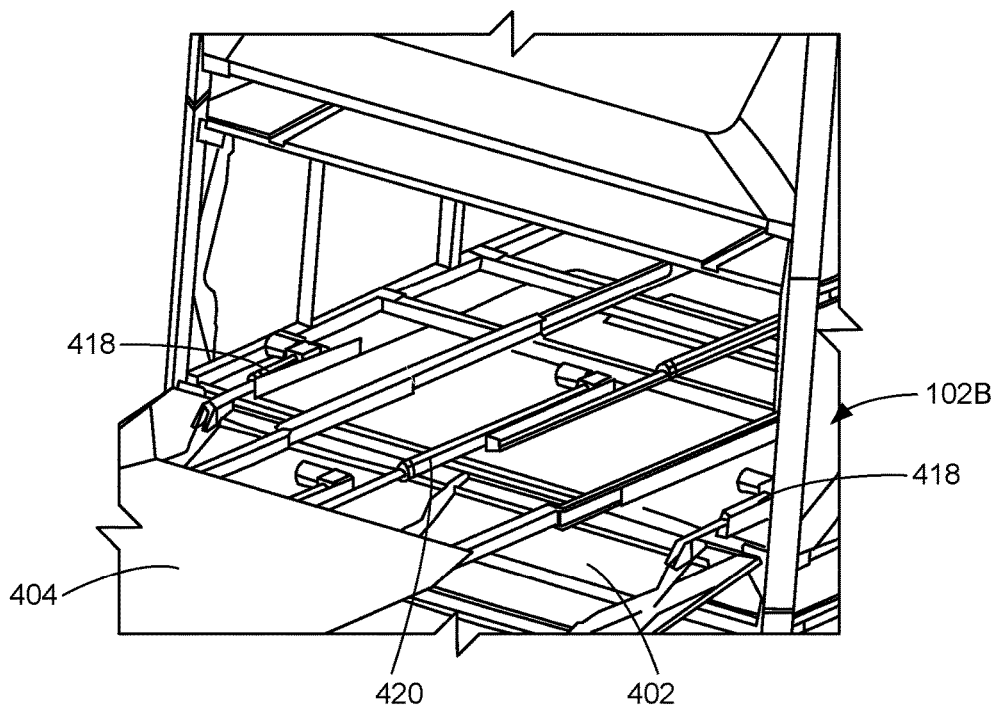

FIG. 4B is an enlarged view of the second container 102B with the respective hinged cover 402 open and landing pad 404 extended. In the illustrated example of FIG. 4B, the hinged cover 402 of the second container 102B includes example wall actuators 418 operable to open and close the hinged cover 402 of the second container 102B. In FIG. 4B, each hinged cover 402 is actuated by two wall actuators 418. Referring again to FIG. 4A, internal aspects to the hinged cover 402 associated with the first container 102A are obscured from view. However, in the example of FIG. 4A, the first container 102A also includes the hinged connection 414, the lower surface 416, and the wall actuator(s) 418. In FIG. 4A, the first container 102A includes the same internal aspects as the second container 102B and is stacked and rotated 180° relative to the second container 102B. In FIG. 4A, the wall actuators 418 are communicatively coupled to one or more container controllers 408. For example, the wall actuator 418 for the first container 102A is communicatively coupled to a first one of the container controller 408 and the wall actuator 418 of the second container 102B is communicatively coupled to a second one of the container controller 408. In FIG. 4A, the extendable landing pads 404 are included in the containers 102A, 102B of the stacked housing container system 100.

Referring again to FIG. 4B, an example powered actuator arm 420 extend from the inside of the container 102B to the outside of the container 102B to extend and retract the landing pad 404. The powered actuator arm 420 is operative to extend and retract the landing pad 404. Additionally, the actuator arm 420 is communicatively coupled to the respective container controller 408. In some examples, the extendable landing pad 404 extends when the container controller 408 determines the rotorcraft 300 is to land. In some examples, the extendable landing pad 404 retracts (e.g., into the second container 102B) when the container controller 408 determines the rotorcraft 300 has landed and is to be stored to ensure the safety of the rotorcraft 300. In some examples, the landing pads 404 include one or more sensors, such as temperature sensors, proximity sensors, touch sensors, load cells, etc. The sensors of the landing pads 404 provide information to the container controller 408 to assist in determining when the rotorcraft 300 lands, takes off, etc.

Referring again to FIG. 4A, the example container controllers 408 each include an example memory 422. For example, the memory 422 can be any memory such as a volatile memory, a flash memory, etc., for storing instructions, rotorcraft data, and communication signals. The example container controllers 408 can be any type of control system, such as a processor, to control the functions and operations of the respective container. For example, the container controllers 408 can open and close the hinge covers 402, extend and retract the landing pad 404, and communicate with autonomous system described herein for maintenance of the rotorcraft 300. The example container controllers 408 are described in further detail connection with FIG. 5.

Figure 5:
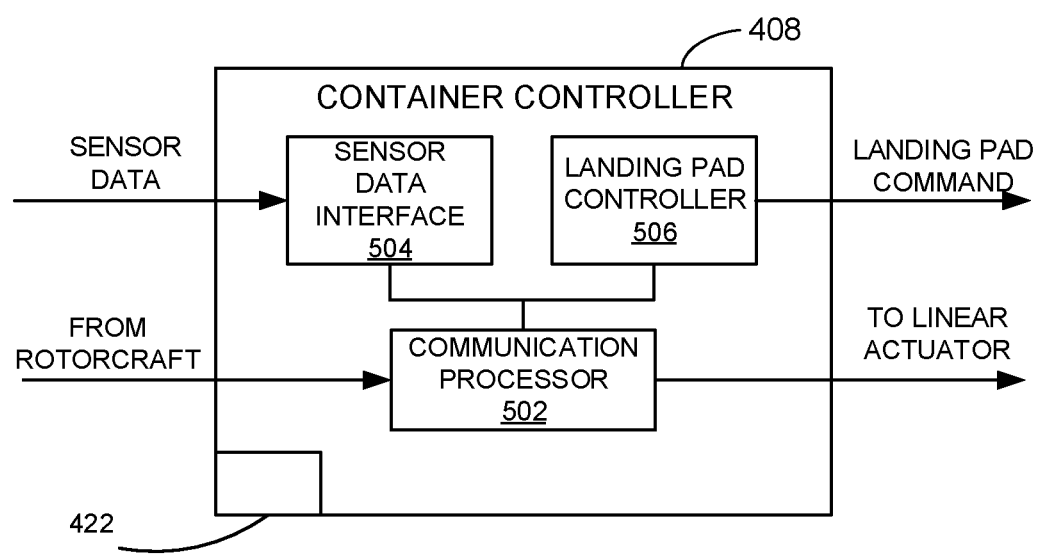
FIG. 5 is a block diagram of an example container controller of the example container controllers of FIG. 4A to control the landing pad of a respective housing container.

FIG. 5 is a block diagram of the example container controller 408 of FIG. 4 (e.g., a container controller 408 associated with the first container 102A and/or the second container 102B) to control the landing pad of a respective container 102A, 102B. The example container controller 408 includes an example communication processor 502, an example sensor data interface 504, and an example landing pad controller 506.

In FIG. 5, the example communication processor 502 is coupled to the example sensor data interface 504 and the example landing pad controller 506. In the illustrated example of FIG. 5, the communication processor 502 is hardware which performs actions based on received information. For example, the communication processor 502 provides instructions to at least the landing pad controller 506 based on data received from the sensor data interface 504 and the communications module 306. Such data may be indicative of a location of the rotorcraft 300. In some examples, the communication processor 502 packages information, such as location data, sensor data, communication signals, etc., to provide to the landing pad controller 506 or to autonomous systems disclosed herein. Additionally, the communication processor 502 controls where data is to be output to powered features (e.g., wall actuators 418 and powered actuator arms 420 of the container) of the containers of the example stacked housing container system 100.

In the illustrated example of FIG. 5, the example sensor data interface 504 is coupled to the communication processor 502 to provide data corresponding to the sensors coupled to the landing pad 404. For example, the sensor data interface 504 collects data from all the sensors monitoring the landing pad 404 and provides the collected data to the communication processor 502 for determining the location of the rotorcraft 300.

In FIG. 5, the example landing pad controller 506 is coupled to the communication processor 502 to generate a control signal for the actuators (e.g., the wall actuator 418 of FIG. 4A and powered actuator arms 420 of FIG. 4B) of the container (e.g., the first container 102A and/or the second container 102B). The control signal determines when to open and close the hinged covers 402 and when to extend and retract the landing pad 404. The landing pad controller 506 can be coupled to the wall actuator 418 and/or the powered actuator arms 420 of the container.

While an example manner of implementing the container controllers 408 of FIG. 4 is illustrated in FIG. 5, one or more of the elements, processes and/or devices illustrated in FIG. 5 may be combined, divided, re-arranged, omitted, eliminated and/or implemented in any other way. Further, the example communication processor 502, the example sensor data interface 504, the example landing pad controller 506, and/or, more generally, the example container controller 408 of FIG. 4 may be implemented by hardware, software, firmware and/or any combination of hardware, software and/or firmware. Thus, for example, any of the example communication processor 502, the example sensor data interface 504, the example landing pad controller 506 and/or, more generally, the example container controller 408 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication processor 502, the example sensor data interface 504, and/or the example landing pad controller 506 is/are hereby expressly defined to include a non-transitory computer readable storage device or storage disk such as a memory, a digital versatile disk (DVD), a compact disk (CD), a Blu-ray disk, etc. including the software and/or firmware. Further still, the example container controller 408 of FIG. 4 may include one or more elements, processes and/or devices in addition to, or instead of, those illustrated in FIG. 5, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
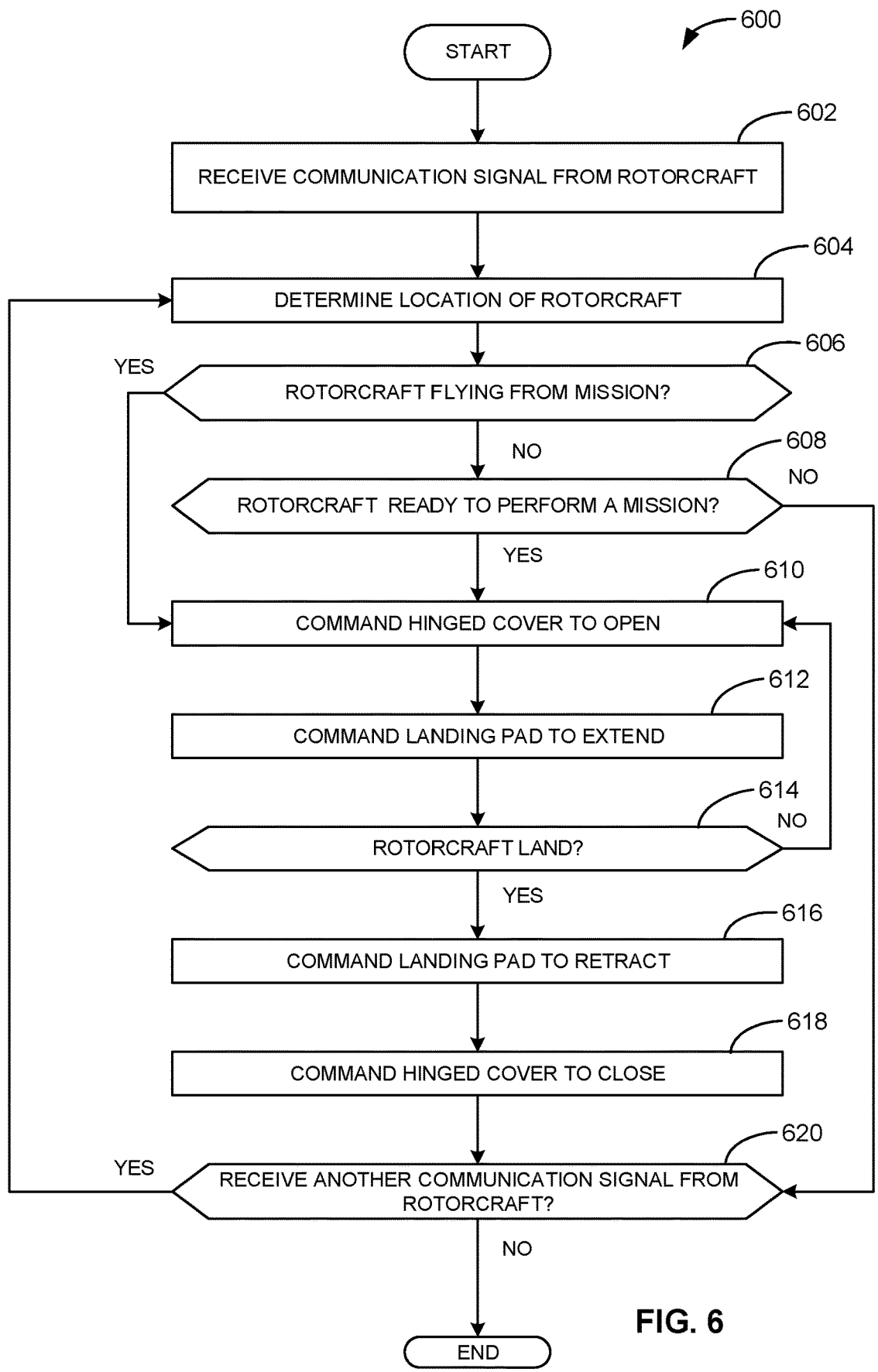
FIG. 6 is a flowchart representative of machine readable instructions which may be executed to implement the example container controller of FIG. 4A and/or 5 to control the landing pad of the respective housing container.

A flowchart representative of example hardware logic, machine readable instructions, hardware implemented state machines, and/or any combination thereof for implementing the container controller 408 of FIG. 4 is shown in FIG. 6. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 6, many other methods of implementing the example container controller 408 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIG. 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 6 is a flowchart representative of machine readable instructions 600 which may be executed to implement the example container controller(s) 408 of FIGS. 4A and 5 to control the landing pad 404 of FIGS. 4A and/or 4B of the respective housing container (e.g., the first container 102A and/or the second container 102B of FIG. 1). Though the example machine readable instructions 600 of FIG. 6 are discussed in connection with a single container controller 408, the machine readable instructions 600 can be executed in connection with any container controller 408, such as the container controller 408 associated with the first container 102A, the container controller 408 associated with the second container 102B, and/or another container controller 408 associated with another container not shown in the illustrations of FIGS. 1-4. The program of FIG. 6 begins when the example communication processor 502 (FIG. 5) receives a communication signal (e.g., communication data) from the communication module 306 of the rotorcraft 300 of FIG. 3 (e.g., the vehicle). (Block 602). The example communication processor 502 determines the location of the rotorcraft 300 based on the communication signal. (Block 604).

The example communication processor 502 determines if the rotorcraft 300 is flying in from a mission (e.g., based on communication data with the rotorcraft). (Block 606). For example, based on the location of the rotorcraft 300, the communication processor 502 determines if the rotorcraft is approaching the stacked housing container system 100 or leaving the stacked housing container system 100. If the rotorcraft 300 is not flying in from a mission (e.g., block 606 returns a NO), the communication processor 502 determines if the rotorcraft 300 is ready to perform a mission. (Block 608). In examples disclosed herein, a mission is a task the rotorcraft 300 is to perform on an agricultural field, such as fertilizing, monitoring, etc. If the communication processor 502 determines the rotorcraft 300 is not ready to perform a mission (e.g., block 608 returns a NO), control turns to block 620. If the communication processor 502 determines the rotorcraft 300 is ready to perform a mission (e.g., block 608 returns a YES), control turns to block 610.

If the rotorcraft 300 is flying in from a mission (e.g., block 606 returns a YES), the landing pad controller 506 (FIG. 5) commands the hinged cover 402 (FIG. 4A) to open. (Block 610). Further, the landing pad controller 506 commands the landing pad 404 to extend. (Block 612). In some examples, the landing pad 404 extends over the hinged cover 402 when the hinged cover is in an open position. After the landing pad 404 extends (block 612), the communication processor 502 determines if the rotorcraft 300 has landed. (Block 614). For example, the sensor data interface 504 collects data indicative of the rotorcraft 300 in contact with the landing pad 404. If the communication processor 502 determines the rotorcraft 300 has not landed (e.g., block 614 returns a NO), control returns to block 610.

If the communication processor 502 determines the rotorcraft 300 has landed (e.g., block 614 returns a YES), the example landing pad controller 506 commands the landing pad 404 to retract to retrieve the rotorcraft. (Block 616). Furthermore, the example container controller 408 commands the hinged cover 402 to close. (Block 618).

When the hinged cover 402 is closed, the example communication processor 502 waits to receive another communication signal from the communication module 306. (Block 620). If the communication processor 502 receives another communication signal from the communication module 306 (e.g., block 620 returns a YES), control returns to block 604. If the communication processor 502 does not receive another communication signal from the communication module 306, the program of FIG. 6 ends.

Figure 7:
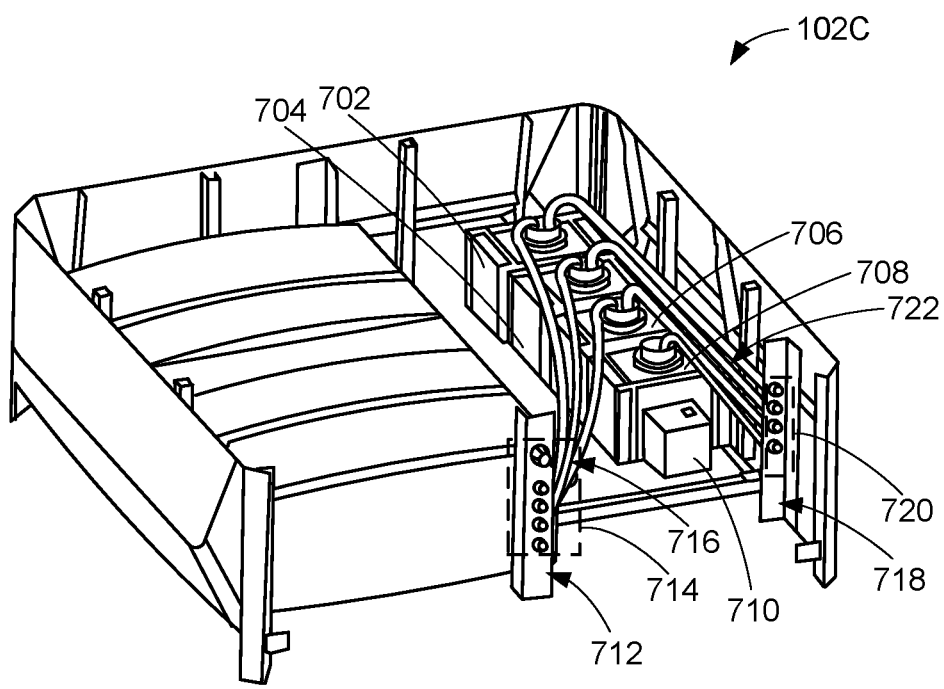
FIG. 7 is an enlarged view of one of the stacked housing containers of FIG. 1 including liquid refilling tanks and a power source.

FIG. 7 is an enlarged view of the third container 102C of FIG. 1 with a top wall and side wall removed. In the illustrated example of FIG. 7, the third container 102C includes an example first liquid refilling tank 702, an example second liquid refilling tank 704, an example third liquid refilling tank 706, an example fourth liquid refilling tank 708, and an example power source 710 (e.g., one or more batteries, etc.). In FIG. 7, the third container 102C is configured and/or designated as the supply container. The third container 102C stores necessary supplies required to perform maintenance on one or more rotorcrafts 300 in the upper containers of the container system 100 (e.g., the first and second containers 102A, 102B). For example, the third container 102C can transfer fluid to and/or receive fluid from one or more rotorcrafts 300. For example, the first, second, and third liquid refilling tanks 702-706 (e.g., refillable reservoirs) can include one or more of fuel, water, pesticides, herbicides, fertilizer, etc., and can be used refill the rotorcraft 300 of a container (e.g., one of the first and second containers 102A, 102B) via a liquid dispensing system including a pump. In some examples, the fourth liquid refilling tank 708 does not refill the rotorcraft 300, and instead receives excess liquid (e.g., fuel, water, pesticides, herbicides, fertilizer, etc.) from the rotorcraft 300 at the completion of a mission. For example, the pump of the liquid dispensing system operates in a reverse direction to pump fluid from the rotorcraft 300 of the container to the fourth liquid refilling tank 708. For example, the fourth refilling tank 708 is periodically drained of the excess liquid collected from rotorcrafts 300 at the completion of one or more missions.

In the illustrated example of FIG. 7, the third container 102C (e.g., the supply container) includes an example center post 712 with example first connectors 714 fluidly coupled to example first fluid lines 716 (e.g., hoses, flexible tubing, etc.) to fill the first, second, and third liquid refilling tanks 702-706. For example, external fluid supplies of fuel, water, pesticides, herbicides, and/or fertilizer, etc. are coupled to a respective one of the first connectors 714 corresponding to the first, second, and/or third liquid refilling tanks 702-706 to fill the respective one of the refilling tanks 702-706 with fluid. For example, the external fluid supplies includes one or more pumps to pump fluid through respective ones of the first connectors 714 and the first fluid lines 716.

In FIG. 7, the third container 102C also includes an example side post 718 including example second connectors 720 fluidly coupled to example second fluid lines 722. In FIG. 7, the second fluid lines 722 fluidly couple the second connectors 720 to ones of the first, second, third, and fourth liquid refilling tanks 702-708. Each of the first and second containers 102A, 102B also include ones of the second connectors 720 to fluidly couple to (e.g., connect with, couple with, etc.) the liquid refilling tanks 702-708 in a daisy chain connection discussed in greater detail in connection with FIG. 8. Each of the containers above the supply container (e.g., the third container 102C) can dispense liquid to respective rotorcraft 300 from the first, second, and third liquid refilling tanks 702-706 and can dispose of excess liquid from the respective rotorcraft 300 to the fourth liquid refilling tank 708 via the daisy chain connection.

Electrical power is also shared between the containers 102A, 102B, 102C. For example, each container to service a rotorcraft 300 (e.g., the first and second containers 102A, 102B) is coupled to the power source 710 via one or more power connectors. In some examples, there are electrical connections (e.g., wires, connecting wires, cables, etc.) leading from the power connectors to the power source 710. In some examples, the power source 710 includes one or more lithium batteries, generators, or other power sources sufficient to power the actuator arms 420, the wall actuators 418, and/or the liquid dispensing systems of each of the containers 102A, 102B.

Figure 8:
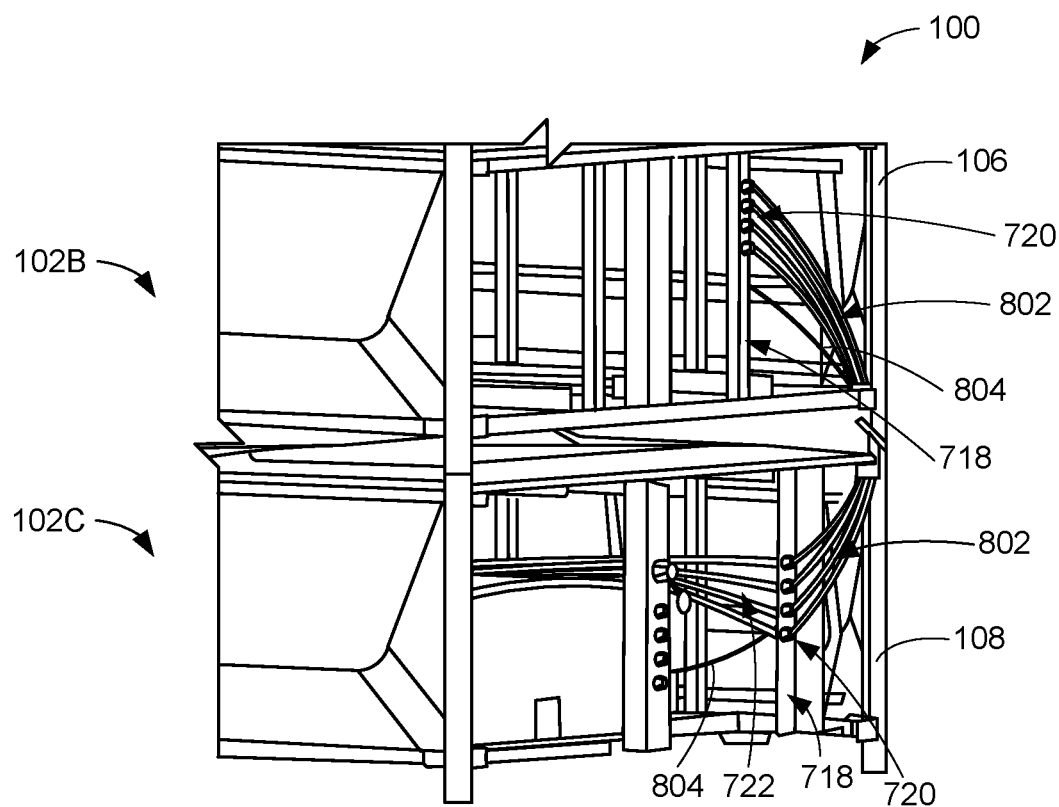
FIG. 8 is a perspective view of the inside of the stacked housing containers of FIG. 1 including the liquid refilling tanks and the power source of FIG. 7.

FIG. 8 is an enlarged perspective view of the inside of the stacked housing container system 100 of FIG. 1 including the second container 102B and the third container 102C (e.g., the supply container) of FIG. 1 with the side walls removed. In the illustrated example of FIG. 8, the second connectors 720 on the second post 718 are coupled to the second fluid lines 722 (all of FIG. 7) leading to the liquid refilling tanks 702-708 (visible in the view of FIG. 7). The perspective view of FIG. 8 illustrates an example daisy chain connection between the second and third stacked containers 102B, 102C of FIG. 1. Though not visible in the view of FIG. 8, the daisy chain connectivity between the second container 102B and the third container 102C can also be applied to the connection between the first container 102A (FIG. 1) and the second container 102B.

In the illustrated example of FIG. 8, the containers 102B, 102C each include third fluid lines 802 coupled respective ones of the second connectors 720. The second connectors 720 of the second container 102B lead to a fluid dispensing system including a pump (not shown). In FIG. 8, the third fluid lines 802 located in the second container 102B are coupled to a tee joint (not visible). For example, the tee joint is located behind the second container leg 106 (FIG. 1) and/or the second post 718 (FIG. 7). In FIG. 8, the tee joint is coupled to further fluid lines extending towards the first container 102A and towards the third container 102C. The fluid lines from the tee joint extending towards the third container 102C can couple to the third fluid lines 802 corresponding to the third container 102C, fluidly coupling the second connectors 720 of the second container 102B to the liquid refilling tanks 702-708. The fluid lines from the tee joint extending towards the first container 102A can fluidly couple to another tee joint associated with the first container 102A. In this manner, the first container 102A can be fluidly coupled to the liquid refilling tanks 702-708. Additional containers (not shown) can include subsequent tee joints and can couple to the liquid refilling tanks 702-708 in the same manner as the first and second containers 102A, 102B. Accordingly, the example daisy chain connections disclosed herein can be applied to any number of containers (e.g., two containers, four containers, ten containers, etc.) to connect the containers in series. The series connection of the containers 102A, 102B, 102C reduces the necessary length of the fluid lines leading to the uppermost stacked container (e.g., the first container 102A), relative to the supply container (e.g., the third container 102C).

In FIG. 8, electrical connections 804 (e.g., connecting wires, etc.) similarly electrically connect the uppermost stacked containers and the power source 710 (FIG. 7). The electrical connections 804 run along the second and third container legs 106, 108 and branch off to connectors located on the second post 718 of the second container 102B. The electrical connections 804 can electrically connect the power source 710 to the first container 102A and to additional containers in the same manner (e.g., via a branched connection from a container leg). Accordingly, the electrical connections 804 can also form a daisy chain connection between containers (e.g., the first, second, and/or third containers 102A, 102B, 102C). Each container can be manufactured to a consistent and uniform specification and can be stacked in any order, regardless of the distance between the container and the supply container (e.g., the third container 102C). In some examples, any container can be modified to include the features of the supply container.

Figure 9:
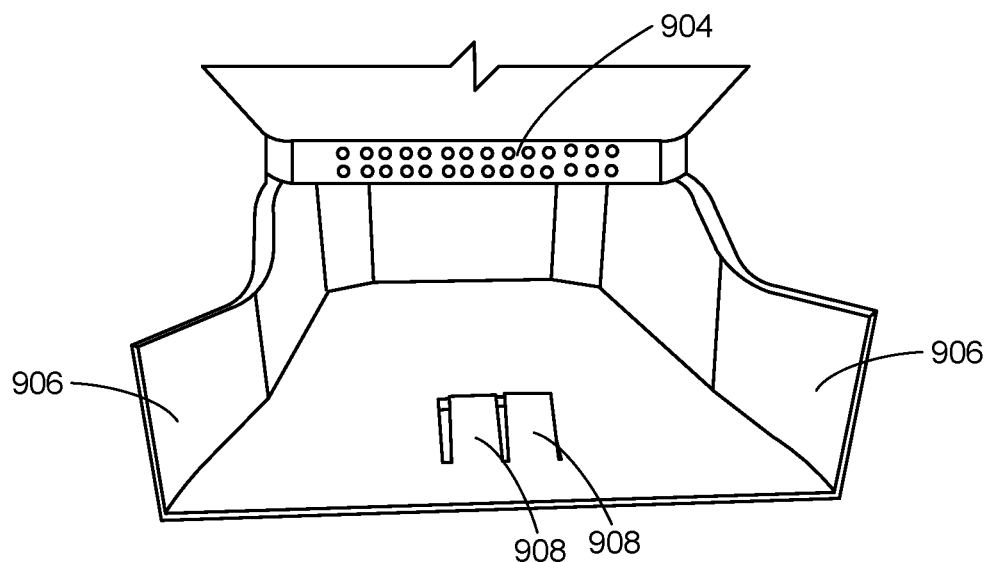
FIG. 9 is an enlarged view of an example battery container of the rotorcraft of FIG. 3 to house a battery.

FIG. 9 is an enlarged view of the example battery container 310 of the rotorcraft 300 to house the battery 308 of FIG. 3. The example battery container 310 includes example electrical connectors 904 to be coupled to the battery 308. The example battery container 310 includes ramped features 906 to guide battery insertion when the battery 308 is installed in and removed from the battery container 310. The example battery container 310 includes spring loaded battery retention fingers 908 to lock the battery 308 in place when inserted into the battery container 310.

Figure 10A:
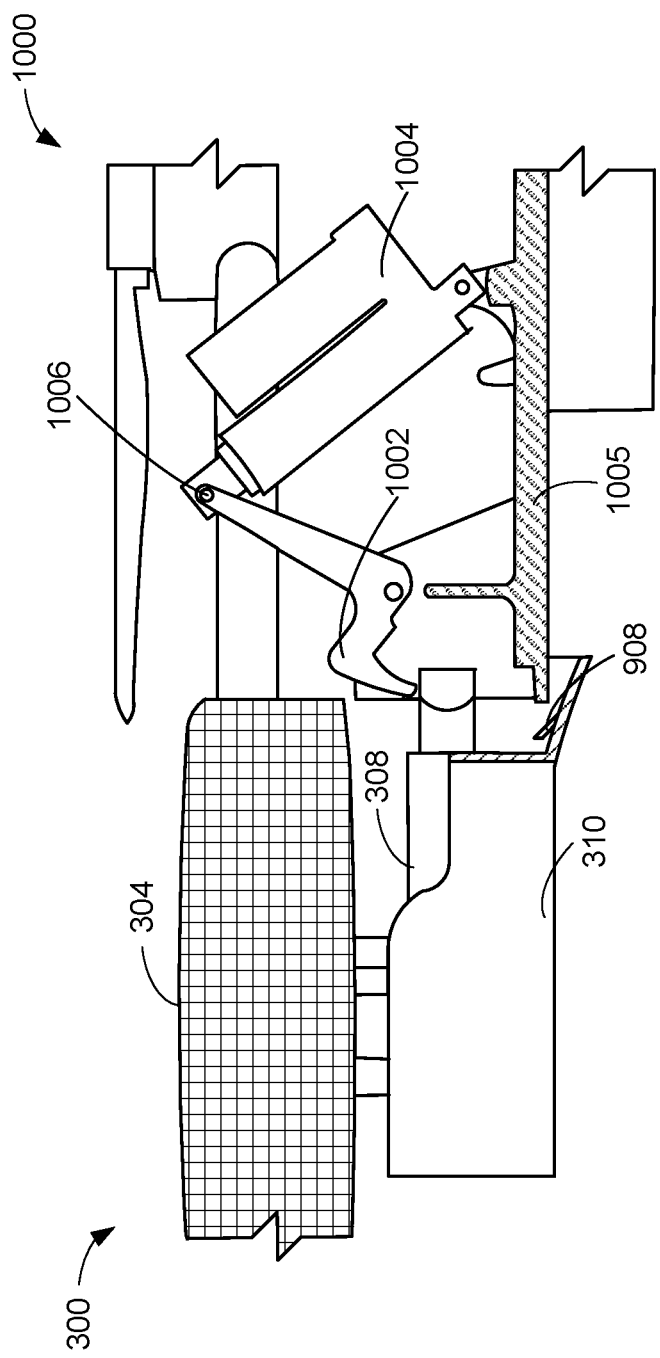
FIGS. 10A and 10B illustrate an example attachment system for battery swapping.
Figure 10B:
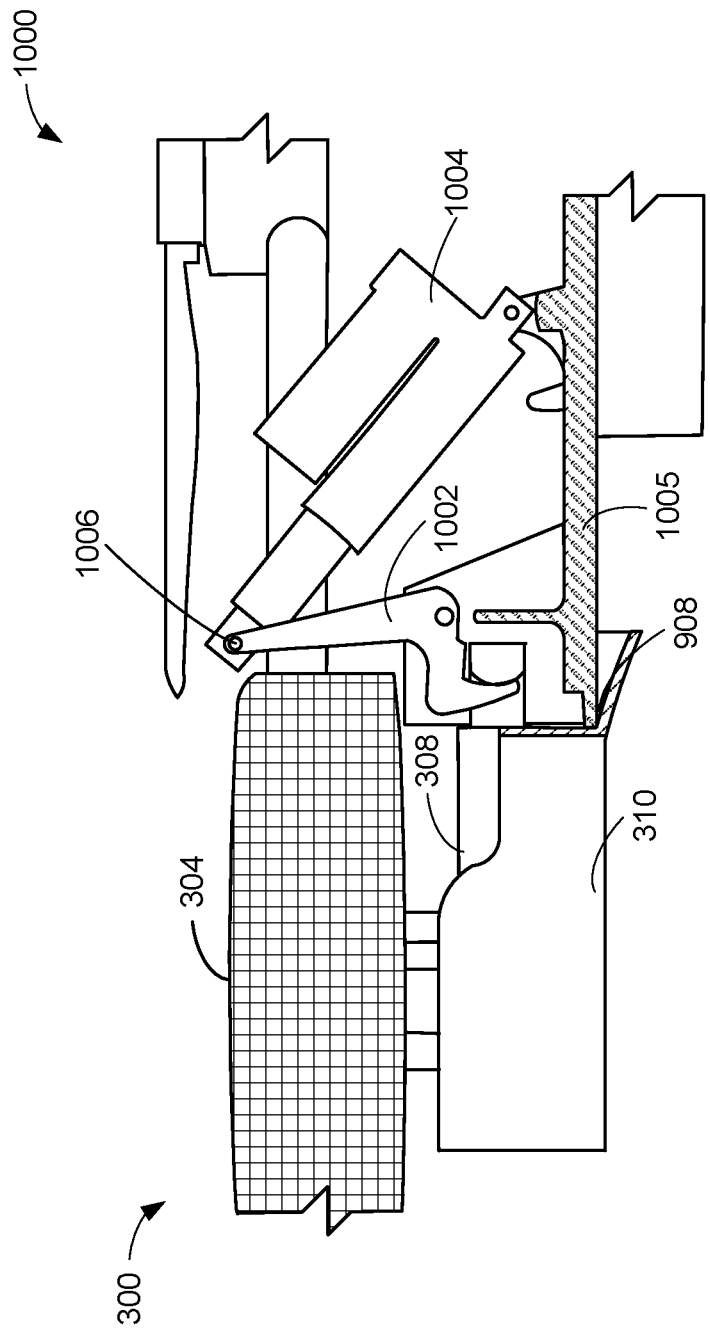

FIGS. 10A and 10B illustrate an example battery attachment system 1000 for battery swapping. The battery attachment system 1000 includes the example central body 304 of the rotorcraft 300, the example battery 308, the example battery container 310 (all of FIG. 3), an example battery lock arm member 1002, and an example first actuating arm 1004. FIGS. 10A and 10B include a partial cross section. In the illustrated example of FIGS. 10A and 10B, the central body 304, the battery container 310, and an example autonomous system base 1005 are cross sectioned. The example actuating arm 1004 can be actuated to extend and to in turn rotate the battery lock arm member 1002 towards and away from the example battery 308. The example battery lock arm member 1002 can be actuated to latch onto a portion of the battery 308. In some examples, prior to the first actuating arm 1004 extending, the autonomous system base 1005 is translated towards the battery container 310 (e.g., via a second actuating arm, via a linear actuator, etc.) to depress the retention fingers 908. In FIG. 10B, the retention fingers 908 are depressed allowing the battery 308 to translate out of the battery container 310.

In some examples, the first actuating arm 1004 is an electric actuating arm driven by a lead screw, ball screw, etc. In other examples, the first actuator arm 1004 may be a belt driven linear actuator, hydraulic linear actuator, pneumatic linear actuator, or any other suitable type of linear actuator. In the example of FIG. 10A, the battery lock arm member 1002 is coupled to the first actuating arm 1004 via a pin joint 1006.

The example first actuating arm 1004 may be controlled by a communication module. The communication module of the battery attachment system 1000 may communicate with the container controller 408 (FIG. 4) to determine when to command the first actuating arm 1004 to extend to attach (e.g., grab, secure, etc.) the battery 308 to the autonomous system base 1005). Alternatively, the communication module of the battery attachment system 1000 may communicate with the communication module 306 (FIG. 3) of the rotorcraft 300. For example, the communication module 306 may notify the communication module controlling the first actuating arm 1004 when the battery 308 needs to be charged, replaced, etc. In some examples, the communication module controlling the first actuating arm 1004 communicates via WAN, Bluetooth®, or any other wireless protocol.

In some examples, the battery attachment system 1000 is integrated with an autonomous system to automate the process of battery swapping by automatically replacing the battery 308 when the rotorcraft 300 lands on the landing pad 404 (FIG. 4). An example autonomous system for swapping the battery 308 is discussed in greater detail in connection with FIGS. 11 and 12. For example, every time a rotorcraft 300 completes a mission, the rotorcraft 300 returns to the central location for maintenance. In some examples, one or more human operators wait for the return of the rotorcraft 300 to replace the battery 308.

FIGS. 11A, 111B, 11C, and 11D illustrate steps taken by an example autonomous system 1100 to remove the battery 308 from the central body 304 (both of FIG. 3). FIGS. 11A-11D include an example second actuating arm 1101, example charging stations 1102, an example gear motor 1104, the example battery 308, and the example rotorcraft 300 (FIG. 3). The example autonomous system 1100 eliminates the need for the human operators to be in the central location for replacing batteries (e.g., battery 308) every time a rotorcraft 300 returns from a mission. For example, the second actuating arm 1101, the charging stations 1102, and the example gear motor 1104 are coupled to the power source 710 (FIG. 7) of the third container 102C (FIG. 1) (e.g., the supply container), to receive power from the power source 710 via the daisy chain connection discussed in connection with FIGS. 7-8.

Figure 11A:
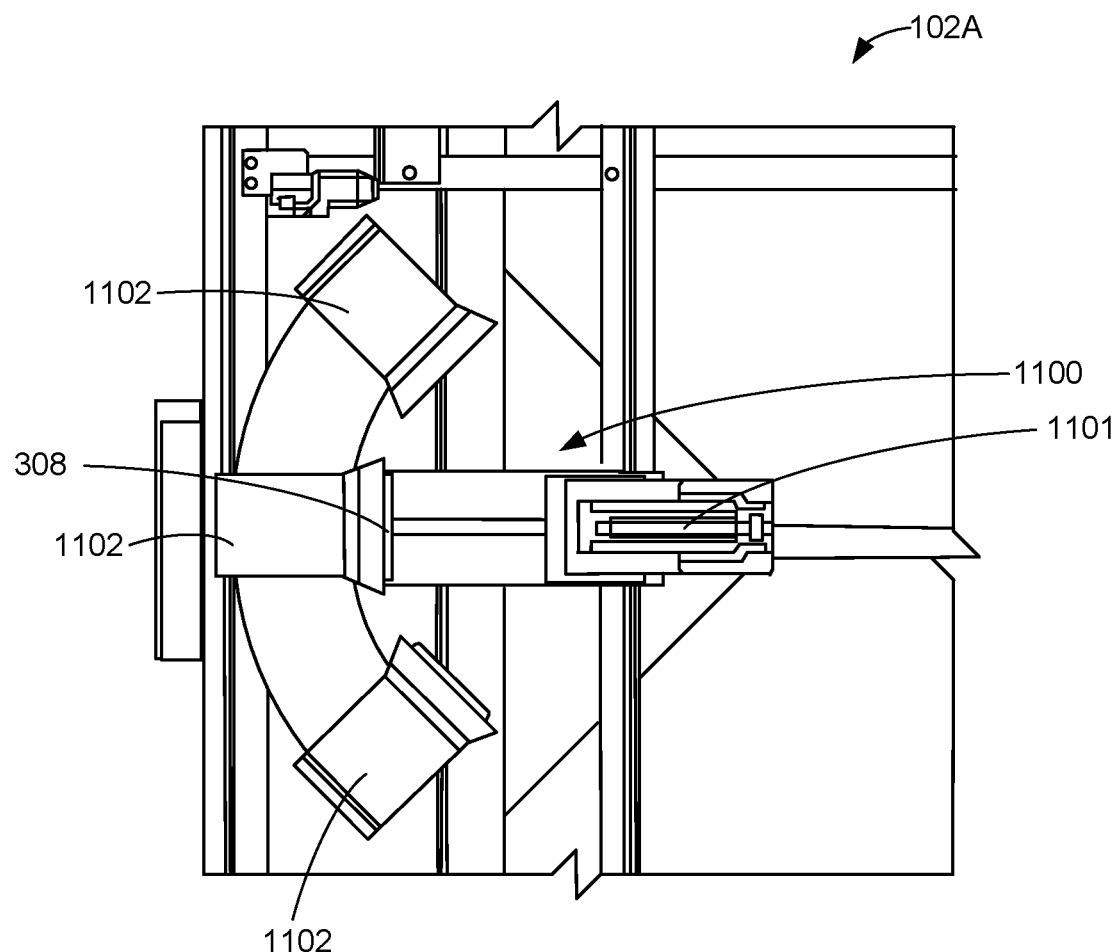
FIGS. 11A, 11B, 11C, and 11D illustrate steps taken by an autonomous system to remove the battery from a battery container.

FIG. 11A is a top view of the example first container 102A of FIG. 1. In the illustrated example of FIG. 11A, the top wall of the first container 102A is removed. In FIG. 11A, the autonomous system 1100 aligns the second actuating arm 1101 with the battery 308. In FIG. 11A, the plane in which the second actuating arm 1101 extends and retracts is the same as the plane including the battery 308 and the charging stations 1102. In some examples, an electromagnet on the second actuating arm 1101 can be selectively energized to couple the electromagnet to a reciprocal magnet on the battery 308. Additionally or alternatively, the second actuating arm 1101 can extend and/or retract aspects of the battery attachment system 1000 (FIG. 10A) such as the battery lock arm member 1002, the example first actuating arm 1004, and the autonomous system base 1005 to attach (e.g., grab, secure) the battery 308 via the battery attachment system 1000. In FIG. 11A, the autonomous system 1100 is disposed on one side of the first container 102A proximate the landing pad 404 (FIG. 4). The second actuating arm 1101 is in a recessed state oriented with its free end (e.g., its end including the electromagnet and/or the battery attachment system 1000) toward the charging stations 1102. Though the autonomous system 1100 of FIG. 11A is discussed in connection with the first container 102A, the autonomous system 1100 can be implemented in connection with the second container 102B and/or any other container to receive and service a rotorcraft such as the rotorcraft 300.

Figure 11B:
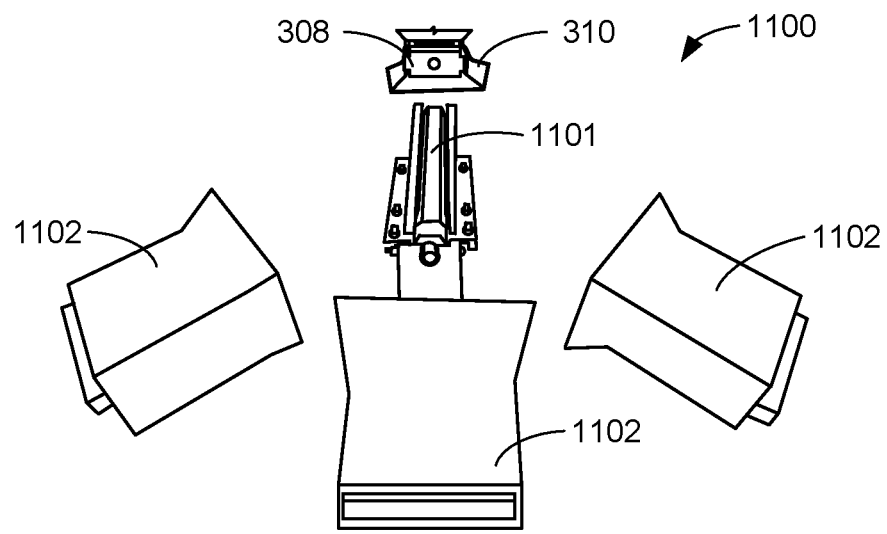

FIG. 11B is a view of the autonomous system 1100 removed from the container 102A. In the illustrated example of FIG. 11B, the second actuating arm 1101 faces the battery container 310 containing the battery 308. In the illustrated example of FIGS. 11B-11D, the battery container 310 is shown without the remainder of the rotorcraft 300. However, the example battery removal discussed in connection with FIGS. 11B-11D can be implemented in connection with the battery container 310 coupled to the rotorcraft 300 in one of the containers 102A, 102B and/or in an additional container.

Figure 11C:
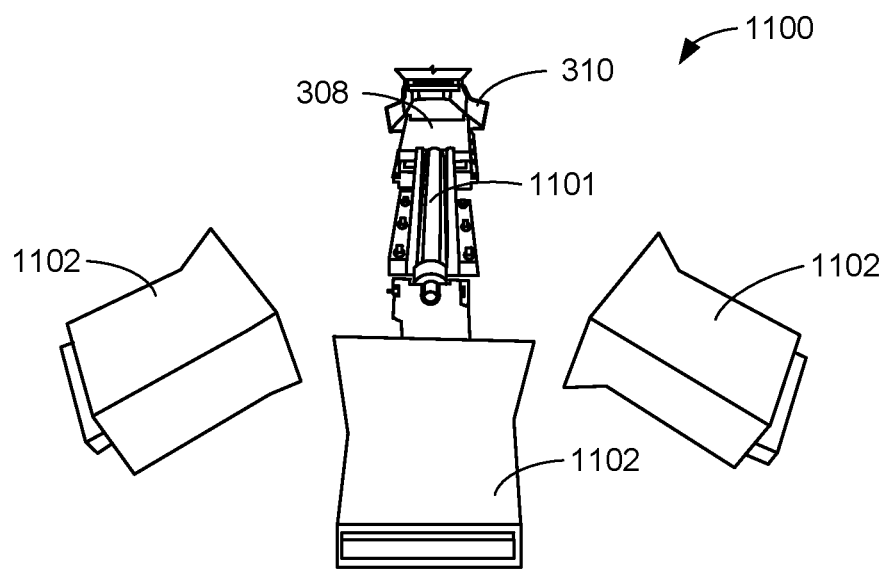

In the illustrated example of FIG. 11C, the second actuating arm 1101 is actuated towards the battery 308. The second actuating arm 1101 couples to the battery 308 via a magnetic connection and/or via the battery attachment system 1000. In some of these examples, when the battery container 310 is implemented in connection with an autonomous system 1100 utilizing magnetic battery coupling, the battery container 310 does not include the retention fingers 908 (FIG. 9). In FIG. 11C, the second actuating arm 1101 is retracted from the battery container 310 when the battery 308 is attached via a magnetic connection and/or via the battery attachment system 1000. In this manner, the second actuating arm 1101 removes the battery 308 from the battery container 310.

Figure 11D:
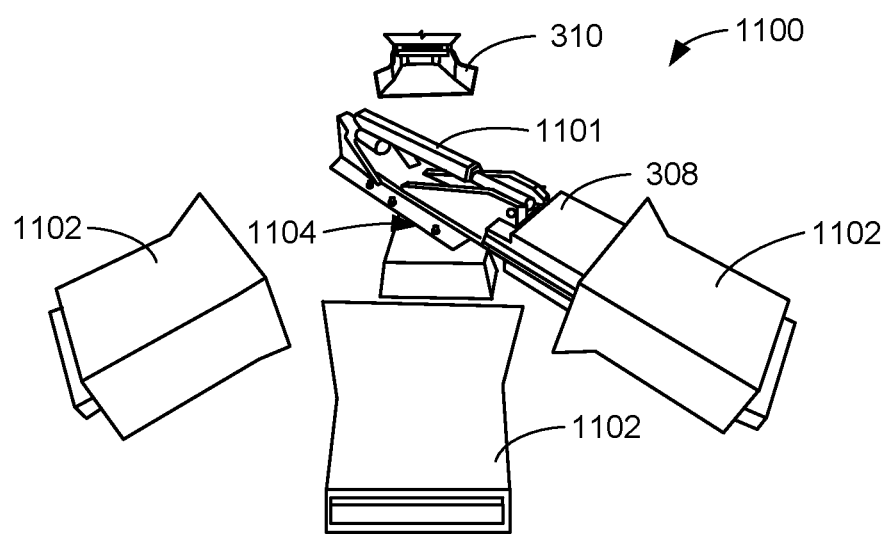

In the illustrated example of FIG. 11D, an example gear motor 1104 rotatably drives the second actuating arm 1101. In FIG. 11D, the gear motor 1104 rotates the second actuating arm 1101 after the second actuating arm 1101 is retracted and attached to the battery 308. In FIG. 11D, the gear motor 1104 rotates the second actuating arm 1101 to align the battery 308 with one of example charging stations 1102. In FIG. 11D, the second actuating arm 1101, the battery 308, and the charging stations 1102 are in the same plane. In this manner, the second actuating arm 1101 is actuated to extend in the direction of one of the charging stations 1102 to deposit the battery 308. When the battery 308 meets the charging station 1102, the autonomous system 1100 releases the battery 308 via the electromagnet and/or via the battery attachment system 1000. After the autonomous system 1100 releases the battery 308, the battery 308 is no longer coupled to the second actuating arm 1101.

Figure 12A:
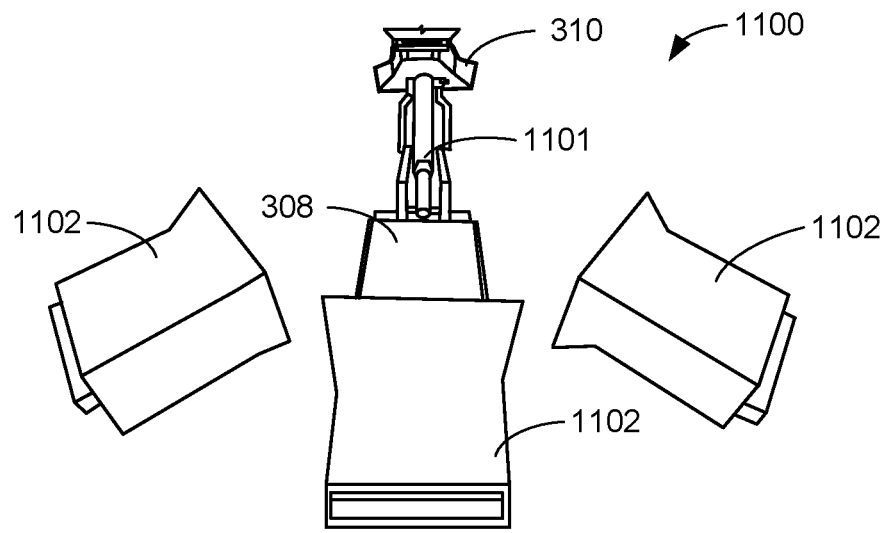
FIGS. 12A and 12B illustrate steps taken by the autonomous system to insert the battery into the battery container.
Figure 12B:
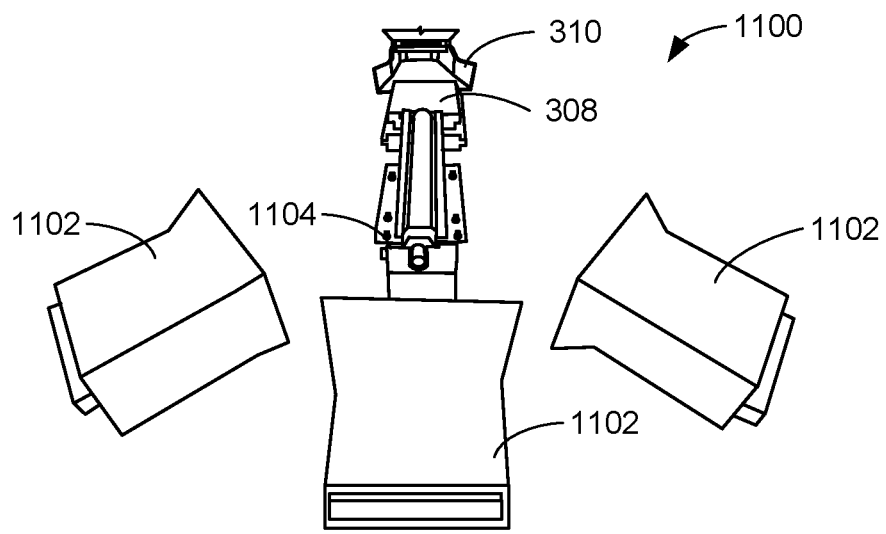

FIGS. 12A and 12B illustrates steps taken by the autonomous system 1100 (FIG. 11A) to remove the battery 308 (FIG. 3) from the charging station 1102 (FIG. 11D) and insert (e.g., install) the battery 308 into the battery container 310 of FIG. 3. Like FIGS. 11B-11D, in FIGS. 12A, 12B, the battery container 310 is shown without the remainder of the rotorcraft 300 (both of FIG. 3). However, the example battery insertion and/or installation discussed in connection with FIGS. 12A, 12B can be implemented in connection with the battery container 310 coupled to the rotorcraft 300 in one of the containers 102A, 102B (FIG. 1). In the illustrated example of FIG. 12A, the example second actuating arm 1101 (FIG. 10) is coupled to the battery 308. In some examples, the second actuating arm 1101 was actuated towards one of the charging stations 1102 and the battery lock arm member 1002 (FIG. 10) latched onto the battery 308 and/or an electromagnet is energized to form a magnetic connection with the battery 308. In some examples, the battery 308 is charged. For example, the battery 308 contains enough power to power the rotorcraft 300 for a mission. In the illustrated example of FIG. 12A, the example second actuating arm 1101 is retracting from the charging stations 1102.

In FIG. 12B, relative to FIG. 12A, the gear motor 1104 has rotated the second actuating arm 1101 to align with the battery container 310. For example, the battery lock arm member 1002 is coupled to the battery 308 and/or the electromagnet is coupled to the battery 308. In FIG. 12B, the gear motor 1104 aligns the battery 308 with the battery container 310. In FIG. 12B, the second actuating arm 1101 is actuated to extend towards the battery container 310.

Figure 13:
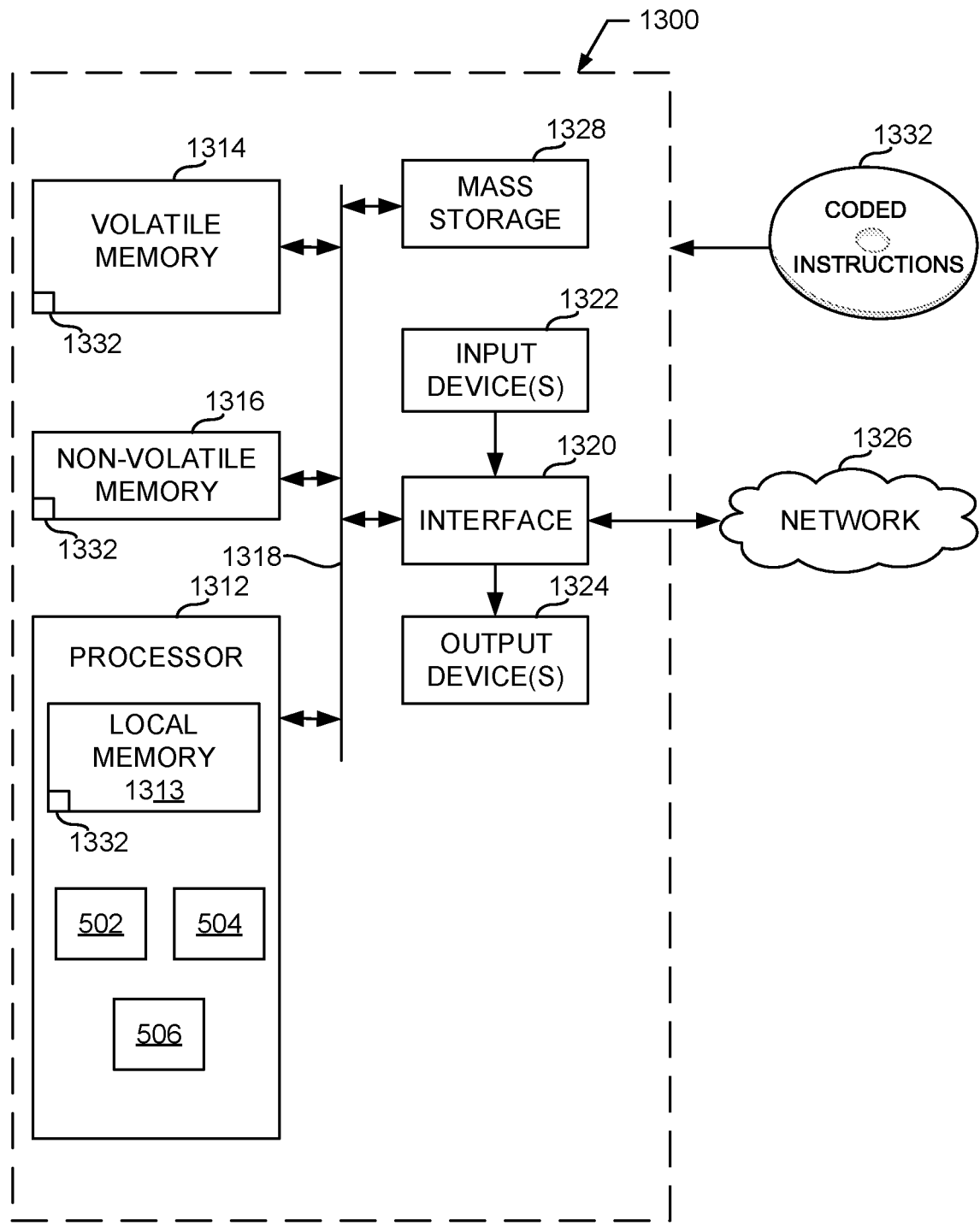
FIG. 13 is a block diagram of an example processing platform structured to execute the instructions of FIG. 6 to implement the example container controller of FIGS. 4A and/or 5.

FIG. 13 is a block diagram of an example processor platform 1300 structured to execute the instructions of FIG. 6 to implement the container controller 408 of FIGS. 4A and 5. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example communication processor 502, the example sensor data interface 504, and the example landing pad controller 506.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1012. The input device(s) can be implemented by, for example, an audio sensor, a microphone, a camera (still or video), a keyboard, a button, a mouse, and/or a voice recognition system.

One or more output devices 1324 are also connected to the interface circuit 1320 of the illustrated example. The output devices 1324 can be implemented, for example, by a tactile output device and/or speaker. The interface circuit 1320 of the illustrated example, thus, typically includes a graphics driver card, a graphics driver chip, and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

The machine executable instructions 1332 of FIG. 6 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed for housing rotorcrafts, such as agricultural UAV systems. The disclosed methods, apparatus and articles of manufacture improve the efficiency of maintenance of agricultural UAV systems and provide protection to the UAV systems.

Example 1 includes an apparatus to house a vehicle, comprising a first container leg disposed on a first corner of a first container, a second container leg disposed on a second corner of the first container, a third container leg disposed on a third corner of the first container, a fourth container leg disposed on a fourth corner of the first container, at least one of the first, second, third, and fourth container legs having an upper portion with a ramped receiving slot and a lower portion with a first ramped foot, and wherein the ramped receiving slot is to receive a protrusion associated with a second ramped foot of a second container different from the first container, a hinged wall cover extending between the first corner and the second corner of the first container, the hinged wall cover having a wall actuator to open and close the hinged wall cover, and a landing pad, an actuator arm operative to extend and retract the landing pad to retrieve a rotorcraft.

Example 2 includes the apparatus of example 1, further comprising a post disposed within the first container, the post including one or more connectors.

Example 3 includes the apparatus of example 2, further including one or more fluid lines coupled to the one or more connectors, the fluid lines to transfer fluid from a liquid refilling tank to the rotorcraft.

Example 4 includes the apparatus of example 2, further including one or more connecting wires coupled to a power source, the power source to provide electrical power to at least one of the wall actuator and the actuator arm.

Example 5 includes the apparatus of example 1, further including a controller to control at least one of the wall actuator and the actuator arm based on communication data from the rotorcraft.

Example 6 includes the apparatus of example 1, wherein the ramped receiving slot has a tapered edge.

Example 7 includes the apparatus of example 1, wherein the hinged wall cover is actuated by two wall actuators.

Example 8 includes an apparatus for a container, comprising a plurality of ramped feet on a first end of the container, the ramped feet including first angled faces and protrusions, a plurality of ramped receiving slots on a second end of the container opposite the first end, the ramped receiving slots including second angled faces and openings, and a landing pad disposed within the container.

Example 9 includes the apparatus of example 8, further including a hinged cover, the landing pad to extend over the hinged cover when the hinged cover is in an open position.

Example 10 includes the apparatus of example 8, further including a multi-rotor Unmanned Aerial Vehicle (UAV) and an actuating arm, the actuating arm to at least one of (a) remove or (b) install a battery on the multi-rotor UAV.

Example 11 includes the apparatus of example 10, wherein the actuating arm is further to insert the battery into a charging station.

Example 12 includes the apparatus of example 8, wherein at least one of the protrusions includes a bore to receive a retaining pin.

Example 13 includes the apparatus of example 8, wherein the container is a first container, the ramped receiving slots are first ramped receiving slots, and the openings are first openings, further including a second container to stack with the first container, the second container including a plurality of second ramped receiving slots including third angled faces and second openings, the second openings to receive the protrusions.

Example 14 includes the apparatus of example 13, wherein the second ramped receiving slots include tapered edges to urge the protrusions towards a base edge and wherein the first angled faces interface with the third angled faces.

Example 15 includes the apparatus of example 8, wherein the container is a first container, further including a second container and a third container, the second and third containers to house drones, the first, second, and third containers fluidly and electrically coupled with a daisy chain connection.

Example 16 includes a method to control a landing pad, comprising, receiving communication data from a vehicle, the communication data indicative of a location of the vehicle, opening a hinged cover of a container, extending the landing pad, determining if the vehicle has landed on the landing pad, and upon determining that the vehicle has landed on the landing pad, retracting the landing pad.

Example 17 includes the method of example 16, wherein the vehicle is a multi-rotor Unmanned Aerial Vehicle (UAV).

Example 18 includes the method of example 16, further including replacing a battery associated with the vehicle.

Example 19 includes the method of example 16, further including dispensing liquid to the vehicle.

Example 20 includes the method of example 16, further including determining if the vehicle is to perform a mission.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A method to control a first landing pad and a second landing pad, comprising;
   receiving communication data from a vehicle, the communication data indicative of a location of the vehicle;
   opening at least one of a first hinged cover of a first container or a second hinged cover of a second container, the first container in a stack with the second container;
   extending at least one of the first landing pad from the first container in a first lateral direction or the second landing pad from the second container in a second lateral direction, the first lateral direction different from the second lateral direction;
   determining whether the vehicle has landed on at least one of the first landing pad or the second landing pad; and
   in response to determining that the vehicle has landed on the at least one of the first landing pad or the second landing pad, retracting the at least one of the first landing pad or the second landing pad.

2. The method of claim 1, wherein the vehicle is a multi-rotor Unmanned Aerial Vehicle (UAV).

3. The method of claim 1, further including replacing a battery associated with the vehicle when the vehicle is on the at least one of the first landing pad or the second landing pad.

4. The method of claim 1, further including dispensing liquid to the vehicle.

5. The method of claim 1, further including determining whether the vehicle is to perform a mission based on the communication data.

6. The method of claim 1, further including closing at least one of the first hinged cover or the second hinged cover in response to retracting the at least one of the first landing pad or the second landing pad.

7. The method of claim 1, further including determining whether the vehicle has landed on the at least one of the first landing pad or the second landing pad based on sensor data from one or more sensors of the at least one of the first landing pad or the second landing pad.

8. A non-transitory computer readable medium comprising instructions that, when executed, cause programmable circuitry to at least:
   receive communication data from a vehicle, the communication data indicative of a location of the vehicle;
   cause at least one of a first actuator to open a first hinged cover of a first container or a second actuator to open a second hinged cover of a second container, the first container in a stack with the second container;

cause at least one of a third actuator to extend a first landing pad from the first container in a first lateral direction or a fourth actuator to extend a second landing pad from the second container in a second lateral direction, the first lateral direction different from the second lateral direction;

determine whether the vehicle has landed on at least one of the first landing pad or the second landing pad; and in response to determining that the vehicle has landed on the at least one of the first landing pad or the second landing pad, cause at least one of the third actuator to retract the first landing pad or the fourth actuator to retract the second landing pad.

9. The non-transitory computer readable medium of claim 8, wherein the vehicle is a multi-rotor Unmanned Aerial Vehicle (UAV).

10. The non-transitory computer readable medium of claim 8, wherein the instructions, when executed, cause the programmable circuitry to cause replacement of a battery associated with the vehicle when the vehicle is on the at least one of the first landing pad or the second landing pad.

11. The non-transitory computer readable medium of claim 8, wherein the instructions, when executed, cause the programmable circuitry to cause a liquid dispensing system to dispense liquid to the vehicle.

12. The non-transitory computer readable medium of claim 8, wherein the instructions, when executed, cause the programmable circuitry to determine, based on the communication data, whether the vehicle is to perform a mission.

13. The non-transitory computer readable medium of claim 8, wherein the instructions, when executed, cause the programmable circuitry to cause at least one of (a) the first actuator to close the first hinged cover in response to the third actuator retracting the first landing pad or (b) the second actuator to close the second hinged cover in response to the fourth actuator retracting the second landing pad.

14. The non-transitory computer readable medium of claim 8, wherein the instructions, when executed, cause the programmable circuitry to determine whether the vehicle has landed on the at least one of the first landing pad or the second landing pad based on sensor data from one or more sensors of the at least one of the first landing pad or the second landing pad.

15. An apparatus comprising:
memory;
instructions; and
programmable circuitry to execute the instructions to:
receive communication data from a vehicle, the communication data indicative of a location of the vehicle;

cause at least one of a first actuator to open a first hinged cover of a first container or a second actuator to open a second hinged cover of a second container, the first container in a stack with the second container;

cause at least one of a third actuator to extend a first landing pad from the first container in a first lateral direction or a fourth actuator to extend a second landing pad from the second container in a second lateral direction, the first lateral direction different from the second lateral direction;

determine whether the vehicle has landed on at least one of the first landing pad or the second landing pad; and in response to determining that the vehicle has landed on the at least one of the first landing pad or the second landing pad, cause at least one of the third actuator to retract the first landing pad or the fourth actuator to retract the second landing pad.

16. The apparatus of claim 15, wherein the vehicle is a multi-rotor Unmanned Aerial Vehicle (UAV).

17. The apparatus of claim 15, wherein the programmable circuitry is to execute the instructions to cause replacement of a battery associated with the vehicle when the vehicle is on the at least one of the first landing pad or the second landing pad.

18. The apparatus of claim 15, wherein the programmable circuitry is to execute the instructions to cause a liquid dispensing system to dispense liquid to the vehicle.

19. The apparatus of claim 15, wherein the programmable circuitry is to execute the instructions to determine, based on the communication data, whether the vehicle is to perform a mission.

20. The apparatus of claim 15, wherein the programmable circuitry is to execute the instructions to cause at least one of (a) the first actuator to close the first hinged cover in response to the third actuator retracting the first landing pad or (b) the second actuator to close the second hinged cover in response to the fourth actuator retracting the second landing pad.

* * * * *